(12) United States Patent
Houser et al.

(10) Patent No.: US 12,081,099 B2
(45) Date of Patent: Sep. 3, 2024

(54) ELECTRIC MACHINE WITH COOLANT JACKET

(71) Applicant: Dana Heavy Vehicle Systems Group, LLC, Maumee, OH (US)

(72) Inventors: Jordan M. Houser, Sylvania, OH (US); Darren J. Ziskovsky, Bowling Green, OH (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 349 days.

(21) Appl. No.: 17/455,814

(22) Filed: Nov. 19, 2021

(65) Prior Publication Data

US 2023/0163662 A1 May 25, 2023

(51) Int. Cl.
*H02K 5/20* (2006.01)
*H02K 9/193* (2006.01)

(52) U.S. Cl.
CPC ............ *H02K 5/203* (2021.01); *H02K 9/193* (2013.01)

(58) Field of Classification Search
CPC .... H02K 5/203; H02K 9/193; H02K 2213/06; H02K 9/19
See application file for complete search history.

(56) References Cited

U.S. PATENT DOCUMENTS

| 4,105,905 | A | 8/1978 | Barcus | |
| 8,519,581 | B2* | 8/2013 | Bradfield | H02K 9/19 310/58 |
| 9,121,335 | B2 | 9/2015 | Quiring et al. | |
| 9,246,370 | B2 | 1/2016 | Hossain et al. | |
| 2009/0140055 | A1* | 6/2009 | Iwasaki | G05D 23/1333 236/34.5 |
| 2014/0150738 | A1* | 6/2014 | Terry | F01P 11/20 123/41.1 |
| 2020/0153291 | A1* | 5/2020 | Van Der Wal | H02K 9/193 |

\* cited by examiner

*Primary Examiner* — Tulsidas C Patel
*Assistant Examiner* — Mohammed Ahmed Qureshi
(74) *Attorney, Agent, or Firm* — McCoy Russell LLP

(57) ABSTRACT

A cooling system for an electric machine is provided that includes a housing at least partially enclosing a rotor, a stator, and a coolant jacket, the coolant jacket including a plurality of coolant channels that receive coolant from a coolant inlet. In the cooling system two or more materials that form boundaries of the plurality of coolant channels are configured to thermally expand at different rates and form a bypass flow passage of at least one of the plurality of coolant channels when the two or more materials are below a threshold temperature or within a lower temperature range.

20 Claims, 4 Drawing Sheets

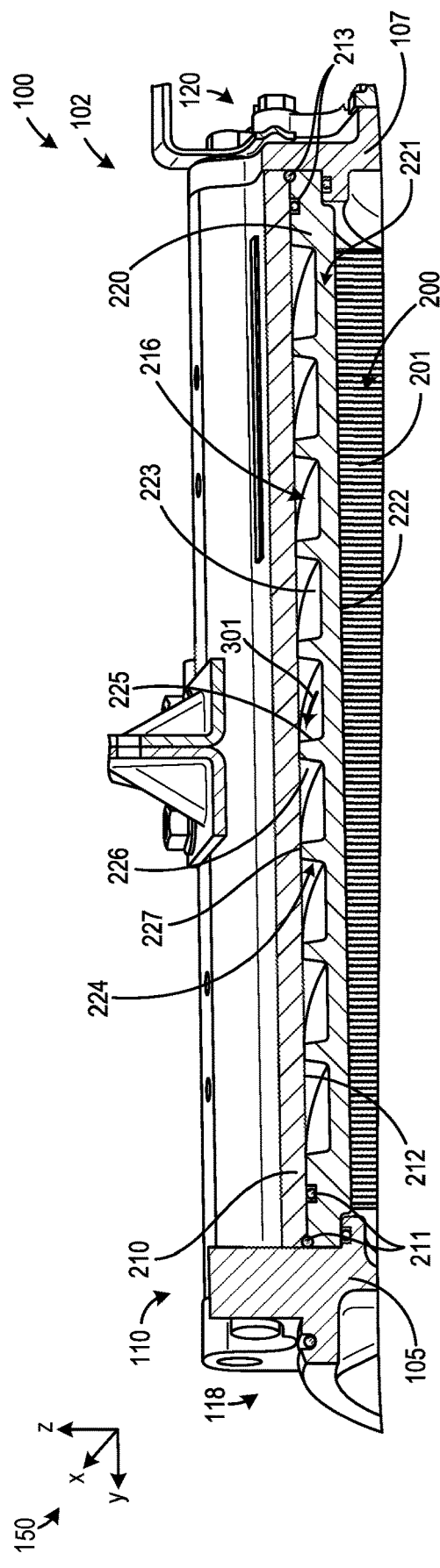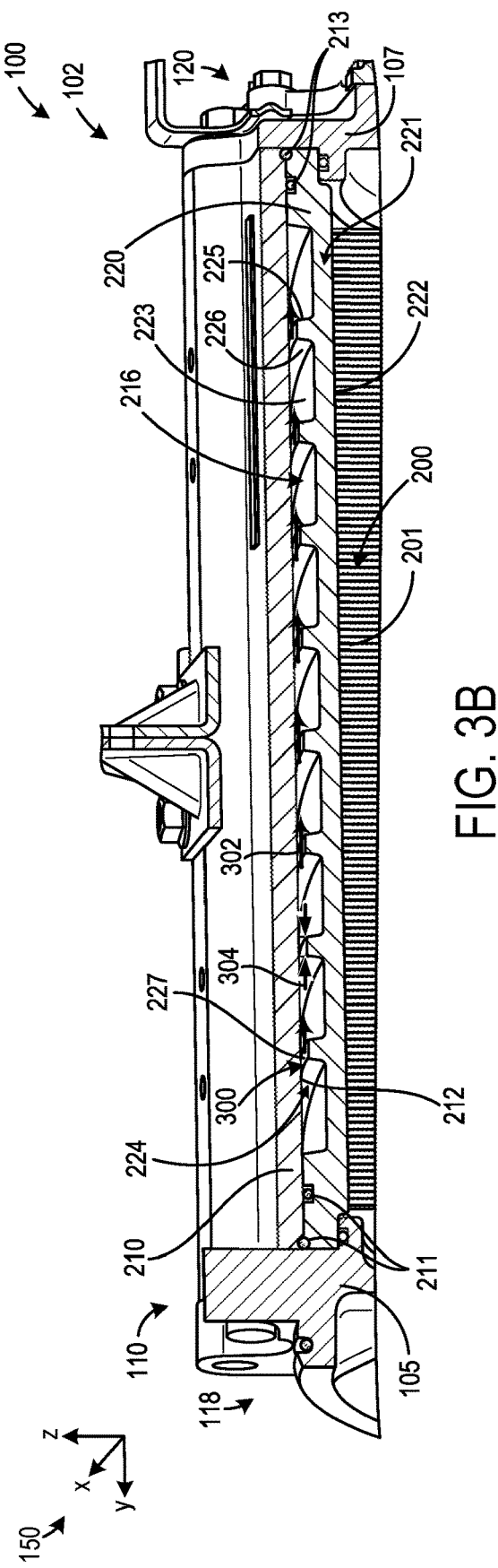
FIG. 3A
FIG. 3B

ELECTRIC MACHINE WITH COOLANT JACKET

TECHNICAL FIELD

The present description relates generally to systems and methods for cooling an electric machine.

BACKGROUND AND SUMMARY

Previous motors in electric drive units, such as electric axles, have used cooling systems to decrease the motor's operating temperature. Specifically, in an attempt to increase motor efficiency, some of these systems have included water jackets that route coolant through the electric motor housing while other systems have included oil channels which directly cool the stator core.

U.S. Pat. No. 9,246,370 B2 from Hossain et al. teaches a motor with a coolant jacket that wraps around the stator core. Hossain makes use of a thermal interface material with a high thermal conductivity to increase the amount of heat transferred between the stator core and the portion of the body of the housing that forms the coolant jacket.

The inventors herein have recognized several issues with Hossain's motor cooling system and other previous cooling systems. For instance, to vary the pressure drop across Hossain's cooling system, as well as other cooling systems, active control strategies may be demanded. For instance, pump and valve control may be coordinated in an attempt to achieve desired flowrates and pressures in the cooling system. If active control strategies are not used, the system's pressure drop under low temperature conditions may be greater than desired, thereby reducing system efficiency.

To resolve at least some of the aforementioned issues, the inventors have developed a cooling system for an electric machine. In one example, a housing of the motor at least partially encloses a rotor, a stator, and a coolant jacket. The coolant jacket includes a plurality of coolant channels designed to receive coolant from a coolant inlet. Further, the materials that form the boundaries of the coolant channels are configured to thermally expand at different rates. A bypass channel is formed between the housing and the coolant channels, when the machine is operating below a threshold temperature or within a lower temperature range, due to this thermal expansion variance. This bypass channel allows the pressure drop of the coolant jacket during lower temperature conditions to be decreased. Thus, the cooling system may passively achieve a decrease in the coolant jacket's pressure drop during lower temperature operating conditions, which may be less costly than active control strategies for varying cooling system pressure drop. In this way, the electric machine may be more efficiently operated with a less complex system that is less prone to component degradation, if desired, when compared to systems which use valves for active coolant flow adjustment, for instance.

In another example, the coolant jacket may be included in a motor cartridge that further includes the rotor and the stator. The motor cartridge may form a press-fit interface with the motor housing. The coolant channels may thus be formed between the motor cartridge and the housing. In this way, the structure that achieves the bypass flow passage arrangement can be efficiently formed using the motor cartridge arrangement. Manufacturing and maintenance costs may be decreased as a result.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 3A and 3B show a portion of the cross-sectional view of the electric motor shown in FIG. 2, operating under first and second conditions, respectively.

FIGS. 2-4 are drawn approximately to scale. However, other relative component dimensions may be used, in alternate embodiments.

DETAILED DESCRIPTION

The following description relates to a cooling system for an electric machine with a coolant jacket disposed within a housing. The housing and the coolant jacket are formed of materials which thermally expand and contract at different rates as the machine temperature changes. Thus, the coolant jacket and the housing are formed of materials having a variance in coefficients of thermal expansion. As such, when operating under lower temperature conditions, the coolant jacket contracts more rapidly (relative to the housing) so that bypass flow passages are created between adjacent coolant channels. In this way, the system's pressure drop may be both passively and temperature-dependently adjusted, to increase system efficiency by avoiding undesirable pressure drops at lower operating temperatures that result in diminished system efficiency. The coolant jacket may be formed in a cartridge that further includes the machine's rotor and stator. Using this cartridge construction permits the housing and the coolant jacket to be more efficiently constructed and assembled using the materials having different coefficients of thermal expansion. Consequently, the system may be efficiently operated due to the passive bypass flow passage functionality using a lower cost construction, if wanted, when compared to more complicated active control strategies that may be used for the cooling system.

Figure 1:
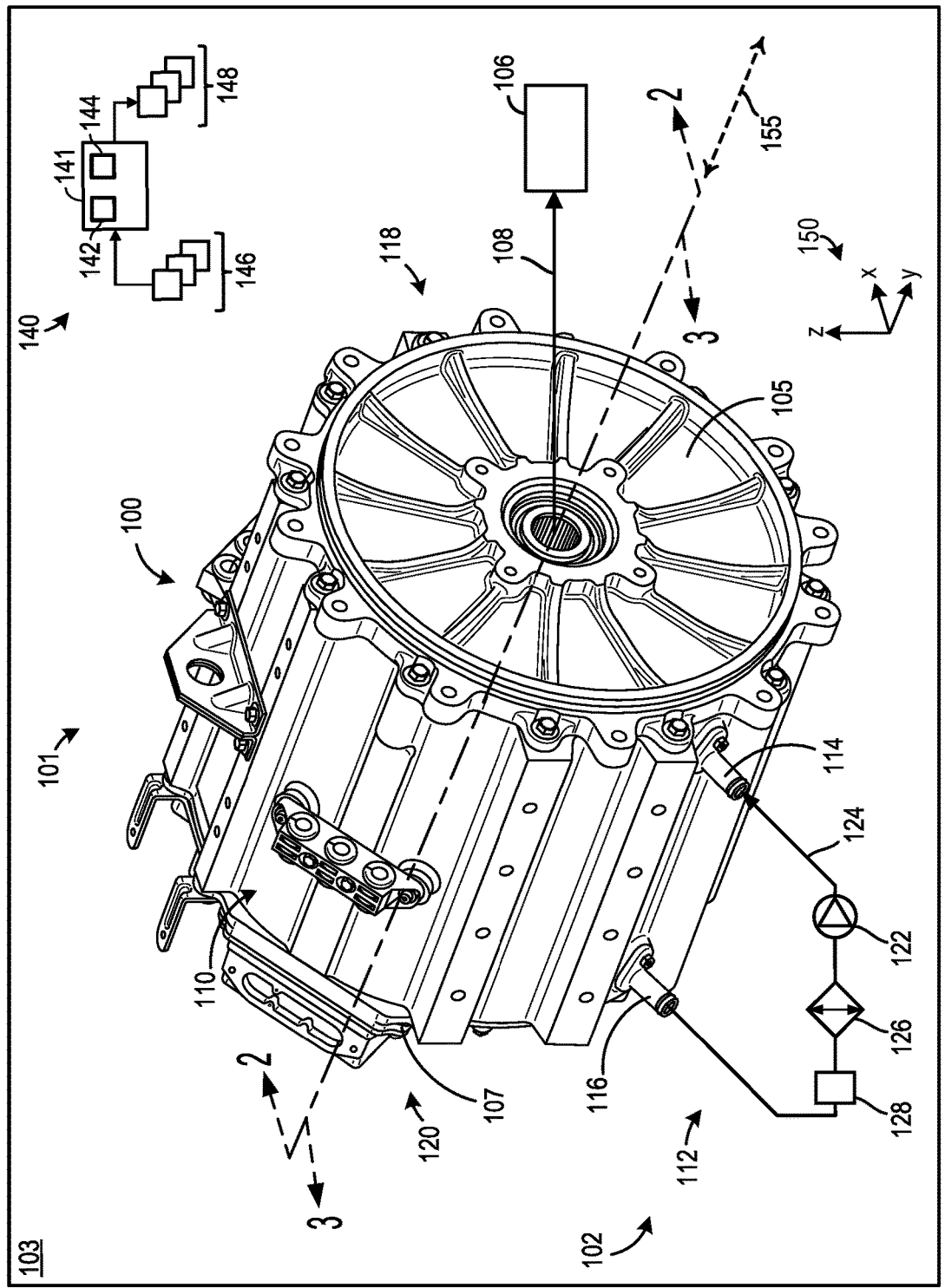
FIG. 1 schematically depicts an electric motor with a cooling system.
Figure 2:
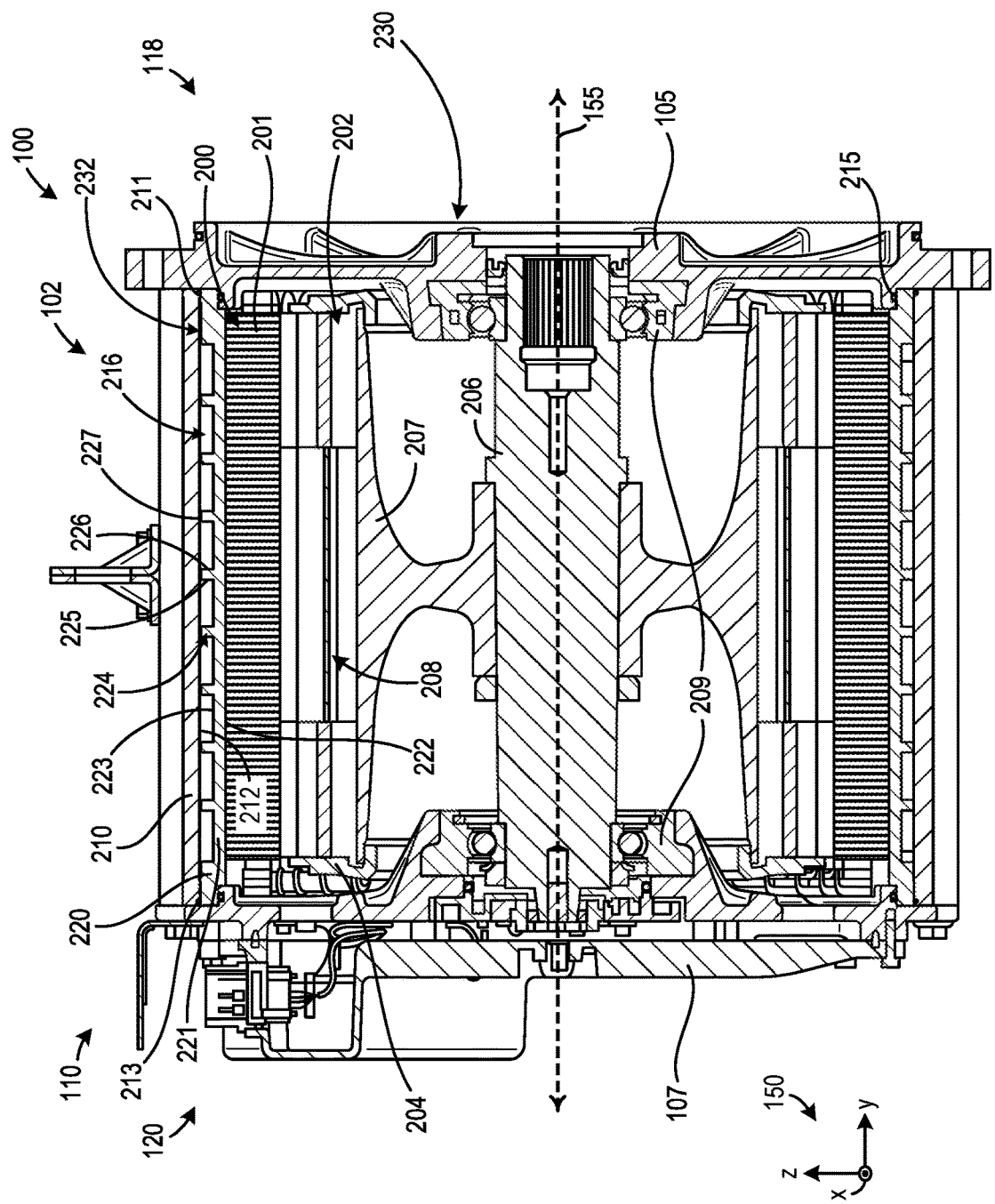
FIG. 2 shows a cross-sectional view of the electric motor depicted in FIG. 1.
Figure 4:
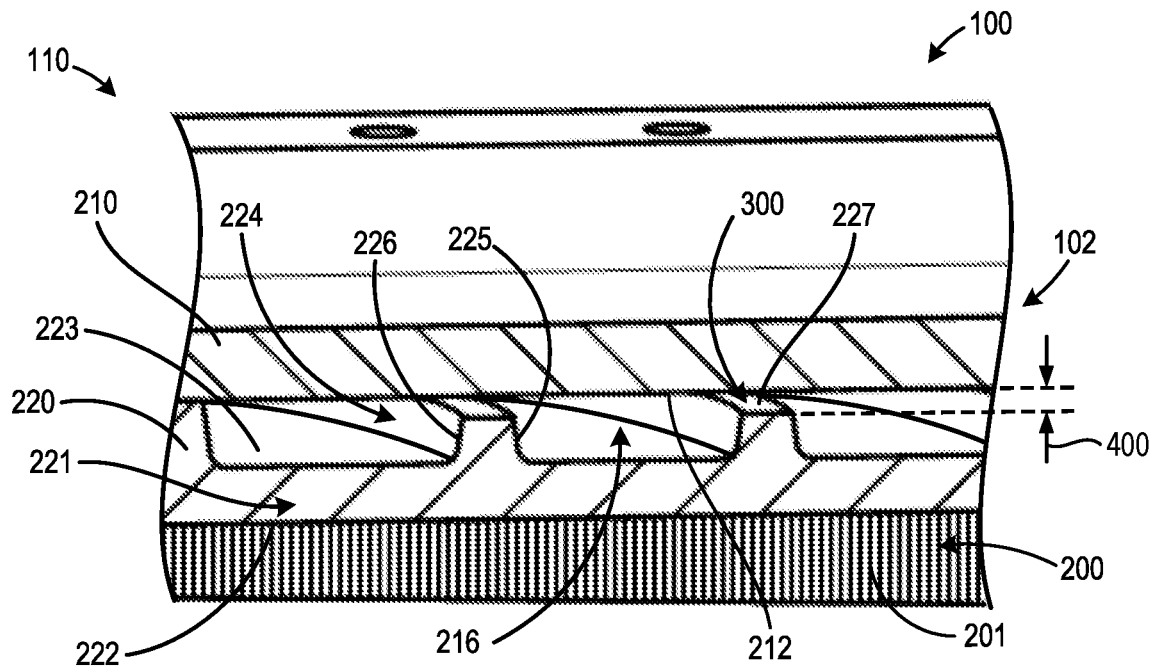
FIG. 4 shows a detailed view of the electric motor, as depicted in FIG. 3B, operating under the second condition.
Figure 5:
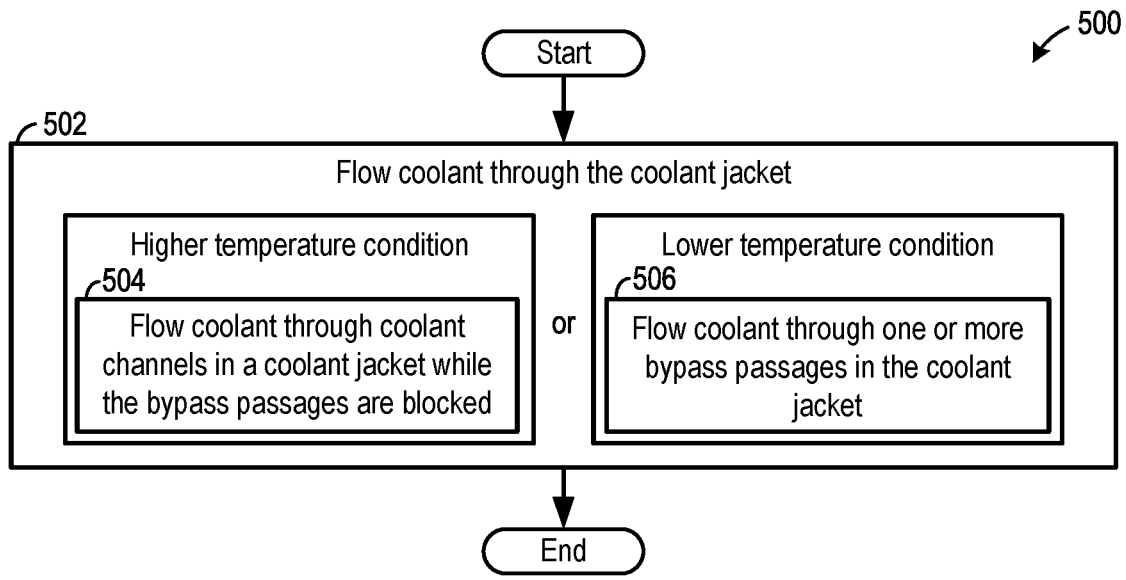
FIG. 5 shows a method for a cooling system according to one example.

FIG. 1 illustrates a cooling system for an electric motor. FIG. 2 shows a cross-section of the electric machine and cooling system with a coolant jacket formed in a machine housing. FIGS. 3A and 3B depict a portion of the electric machine housing with the coolant jacket depicted during higher and lower temperature operating conditions, respectively. FIG. 4 shows a detailed view of the electric machine housing operating under the lower temperature condition. FIG. 5 is a flow chart depicting operation of the electric machine cooling system.

FIG. 1 illustrates an electric drive unit 101 with an electric machine 100 (e.g., an electric motor or motor-generator). FIG. 1 further schematically depicts a cooling system 102 for the electric machine 100. The electric drive unit 101 may additionally include a gearbox, an inverter, and/or other suitable components. The electric machine 100 and cooling system 102 may reside in an electric drive of a vehicle 103.

In such examples, the vehicle may take a variety of forms, in different embodiments, such as a light, medium, or heavy duty vehicle. Alternatively, the electric machine may be used in other suitable systems, such as systems in manufacturing facilities, other industrial settings, and the like.

In some examples, in addition to the electric machine 100, the vehicle 103 may further include another motive power source, such as an internal combustion engine (ICE) (e.g., a spark and/or compression ignition engine) or other suitable devices designed to generate rotational energy. The internal combustion engine may include conventional components such as cylinders, pistons, valves, a fuel delivery system, an intake system, an exhaust system, and the like. Further, the electric machine 100 may include components for generating mechanical power as well as electric power during a regeneration mode, in some cases, such as a housing assembly 110, a stator, a rotor, and the like, the specific structures of which will be further described herein with respect to FIGS. 2-4. Thus, the electric drive unit 101 and electric machine 100 may be utilized in an electric vehicle such as a hybrid electric vehicle (HEV) or an all-electric vehicle.

In some examples, the electric machine 100 may provide mechanical power to a downstream component 106 via an output shaft or other suitable mechanical component, represented by an arrow 108. The component 106 may be a transmission, a gearbox in an electric axle, a differential, and the like. Alternatively, the electric machine 100 may be used in equipment other than a vehicle. As such, the component 106 may be a pump, a compressor, a fan, and the like.

The cooling system 102 may include a coolant circuit 112 designed for cooling the electric machine 100. More specifically, the coolant circuit 112 may be designed for circulating a coolant through the housing assembly 110 of the electric machine, in one example. As such, the housing assembly 110 may include a coolant inlet 114 and a coolant outlet 116. Further, in some examples, the coolant inlet 114 and outlet 116 may be positioned on a side of the machine housing assembly 110, proximate to opposing axial sides 118, 120, respectively. However, alternate arrangements of the coolant inlet and outlet have been contemplated, in other examples. For instance, the coolant inlet 114 and the outlet 116 may be positioned on covers 105, 107 of the housing assembly 110, which may be coupled to the housing at the opposing axial sides 118, 120, respectively, in one example. The arrangement of the coolant inlet and outlet may be based on machine cooling demands and correspondingly the desired coolant flow path, the machine's expected operating environment, etc.

The coolant circuit 112 may include a pump 122 for circulating coolant from the coolant outlet 116 to the coolant inlet 114 via a coolant delivery line 124. In some examples, the coolant may be water, a water ethylene glycol mixture, and the like. The pump 122 may be a fixed displacement pump which may include two operating modes (e.g., on and off), in one example. In other examples, however, the pump 122 may be a variable displacement pump, which may reduce power consumption, which may be particularly desirable when the motor is operating at lower temperatures. Using a fixed displacement pump may decrease cooling system costs and increase system reliability by reducing system complexity. However, a pump with a variable flow rate may be used, in other embodiments. The coolant circuit may further include a heat exchanger 126 that removes heat from the coolant in the coolant circuit. When the heat exchanger is used in the system, the coolant is returned to the housing (via coolant inlet 114) at a lower temperature. However, in other examples, the heat exchanger may be omitted from the system, and the line through which the coolant is transferred may function to remove heat from the coolant.

In some examples, the coolant circuit 112 may further include a filter 128 upstream of the pump for removing impurities and/or contaminants from the coolant, thereby increasing longevity of the pump. The pump 122 and/or the filter 128 may be disposed external to the housing assembly 110, in one example. However, in other examples, the pump and filter may be incorporated in the housing. For instance, the filter may be integrated with the pump and located proximate the coolant inlet 114. In another example, the filter 128 and the pump 122 may be integrated into the housing proximate the coolant outlet 116 and the coolant inlet 114, respectively.

The pump 122 delivers coolant to the coolant inlet 114. From the coolant inlet, the coolant travels into a coolant jacket. In this way, the coolant circuit 112 routes the coolant through the coolant jacket within the housing assembly 110. Further, the coolant jacket may be designed to passively alter a pressure drop of the coolant traveling through the housing during different operating conditions, as will be described in greater detail herein with reference to FIGS. 3A-4.

A control system 140 with a controller 141 may further be included in the vehicle 103. The controller may include a processor 142 and memory 144 with instructions stored therein that, when executed by the processor, cause the controller to perform various methods and control techniques described herein. The processor may include a microprocessor unit and/or other types of circuits. The memory may include known data storage mediums, such as random access memory, read only memory, keep alive memory, combinations thereof, and the like.

The controller 141 may receive various signals from sensors 146 positioned in the electric machine 100 and/or the vehicle 103. Conversely, the controller 141 may send control signals to various actuators 148 at different locations in the system based on the sensor signals. For instance, the controller 141 may send command signals to the pump 122 and, in response, the actuator(s) in the pump may be adjusted to turn the pump on and off. In other examples, the controller may send control signals to the electric machine 100 and, responsive to receiving the command signals, the machine's speed is altered.

An axis system 150 is provided in FIG. 1, as well as FIGS. 2-4, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

FIGS. 2-4 show different views of the electric machine 100, the structure of the housing assembly 110, as well as the components of the electric machine and cooling system enclosed therein. The cross-sectional view shown in FIG. 2 is defined by a lateral cut taken along dashed line 2-2, and the cross-sectional views shown in FIGS. 3A-4 are defined by a lateral cut taken along dashed line 3-3. Thus, the lateral cut planes may pass through a rotational axis 155 of the electric machine 100. The rotational axis 155 is further illustrated in FIG. 2, for reference. Thus, structural aspects of the cooling system 102, such as the coolant jacket of the coolant circuit 112, are depicted in FIGS. 2-4, and details of the cooling system 102 are expanded upon accordingly.

FIG. 2 specifically shows the electric machine 100 including a stator 200 and a rotor 202 that are enclosed in the housing assembly 110. More specifically, the housing assembly 110 may include a machine housing 210 with the end covers 105, 107 coupled thereto, such that the housing and covers collectively enclose the stator 200 and the rotor 202. Further, the machine housing 210 may also at least partially enclose a coolant jacket 220, disposed between the housing 210 and the stator 200, which will be elaborated on herein. The rotor 202 is positioned within the stator 200 and coaxial thereto. The stator 200 may include stator laminations 201, formed as a stack of laminated plates, and stator coils wound through the laminated stack to form end windings. Further, the stator laminations 201 may be constructed out of steel (e.g., electrical steel, silicon steel, and the like).

In some examples, the electric machine 100 may further include one or more balancing plates 204. Specifically, as illustrated in FIG. 2, the balancing plate 204 is positioned on one axial side of the rotor 202. The balancing plate 204 may be attached to a rotor shaft 206 adjacent to the rotor 202. In other examples, however, another balancing plate may be positioned on an opposing axial side of the rotor, such that a rotor core 208 may be interposed between the balancing plates. The balancing plates may serve to fine tune the rotor's rotational mass balance and reduce the chance of imbalances that may decrease machine efficiency and/or lead to premature degradation of components thereof, in some cases. In other examples, the balancing plates may be omitted from the machine.

In embodiments where the electric machine 100 is a permanent magnet AC motor, the rotor core 208 may include permanent magnets that are embedded within rotor laminations of the rotor core. However, in other examples, the permanent magnets may be surface-mounted on the rotor laminations.

The rotor 202 may further include a rotor hub 207 that is profiled to attach to the rotor shaft 206 at its inner diameter and attach to the rotor core 208 at its outer diameter. In alternative examples, the rotor hub may be omitted from the machine and the rotor core may be directly coupled to the rotor shaft 206. The rotor shaft 206 permits rotational energy to be transferred from the machine to an external device (e.g., a transmission, a differential, and the like) or vice versa. Further, the covers 105, 107 may be coupled to the housing 210 (e.g., via bolts, screws, and/or other suitable attachment devices) at opposing axial ends thereof, and at least one of the covers (e.g., the cover 105) may include an opening through which the rotor shaft 206 extends. Even further, the rotor shaft 206 may be supported for rotation within the machine housing assembly 110 (e.g., at the covers 105, 107) by bearings 209, which may be roller bearings such as ball bearings, in some examples.

Turning now to the cooling system 102, the structure and function of the coolant jacket 220 will now be described. The coolant jacket 220 may extend circumferentially around the stator 200 of the electric machine 100. Further, the coolant jacket 220 may include a body 221 with an interior surface 222 and an exterior surface 223. The interior surface 222 of the body 221 may be in face-sharing contact with the stator laminations 201, in some examples. In other examples, however, a thermal interface material may be included between the interior surface 222 of the coolant jacket body and the stator laminations, which may increase heat transfer capabilities between the stator 200 and the coolant jacket 220. The exterior surface 223 of the coolant jacket body 221 may further include a coolant jacket wall 224 which extends radially outward from the exterior surface 223. More specifically, the wall 224 may include side surfaces 225, 226 joined by peripheral surfaces 227, where the side surfaces 225, 226 specifically extend outward from the exterior surface 223 of the coolant jacket body 221.

Further, the coolant jacket wall 224 may form multiple coolant channels 216 that may receive coolant from the coolant inlet 114, depicted in FIG. 1, whereby the coolant may flow along the coolant jacket 220 before exiting the housing assembly 110 at the coolant outlet 116, also depicted in FIG. 1. To elaborate, the coolant channels 216 may be at least partially bound by the side surfaces 225, 226 of the coolant jacket wall 224 and the portions of the exterior surface 223 of the coolant jacket body 221 that extend between the wall 224. The coolant channels 216 may be further bound by an interior surface 212 of the housing, in addition to the side surfaces 225, 226 of the coolant jacket wall 224 and the portions of the exterior surface 223 of the coolant jacket body 221 extending between the side surfaces. The coolant channels 216 may therefore have a polygonal cross-section, such as a rectangular cross-section, in some examples. However, in other examples, the coolant channels may have a different non-polygonal cross section, such as a semi-circular cross-section. For instance, the side surfaces 225, 226 of the coolant jacket wall 224 and/or portions of the exterior surface of the coolant jacket body 221 may be curved, in certain examples.

Further, in some examples, the coolant channels 216 may extend circumferentially around the coolant jacket 220. Specifically, in one example, the coolant channels 216 may form a continuous spiraling coolant path receiving coolant via the coolant inlet. In the spiraling coolant channel embodiment, the wall 224 therefore spirals around the coolant jacket (e.g., in a substantially contiguous design). In this way, coolant routed through the coolant channels 216 in the coolant jacket may flow circumferentially around the stack of stator laminations 201 of the stator 200, effectively removing heat therefrom (via heat transfer between the stator laminations and the interior surface 222 of the coolant jacket body 221). In other examples, however, the coolant jacket 220 may include a distribution manifold fluidically coupled to the coolant inlet which flows coolant to multiple coolant channels in parallel. In this parallel coolant channel embodiment, each of the parallel coolant channels may circumferentially extend around the coolant jacket, such that the wall 224 is segmented to define the parallel coolant channels.

During higher temperature conditions, the peripheral surfaces 227 of the coolant jacket wall 224 are in contact with an interior surface 212 of the machine housing 210, as depicted in FIGS. 2 and 3A.

Arrow 301, as shown in FIG. 3A, depicts the general direction of coolant flow through one of the coolant channels 216. However, in practice, the flow pattern may have greater complexity. In the frame of reference of FIG. 3A, the arrow 301 is shown extending in a counterclockwise direction with regard to the machine's rotational axis, shown in FIG. 2, although the flow pattern may have a clockwise direction in other embodiments. In the case of a spiral coolant channel arrangement, the general direction of flow in sequential channels (in an axial direction) may generally reverse directions. For instance, the direction of coolant flow in a first channel section may be counterclockwise, the direction of coolant flow in a second channel section may be in a clockwise direction, and so on. In the parallel flow arrangement embodiment, the general direction of coolant flow through the coolant channels 216 may have similar directions (e.g., clockwise or counterclockwise in relation to the machine's rotational axis).

During lower temperature conditions, on the other hand, the peripheral surfaces 227 may not continuously contact the interior surface 212 of the housing 210, thus allowing some bypass flow of coolant axially between the channels, as will be elaborated on herein with regard to the material construction and general design of the machine housing and the coolant jacket, particularly with reference to FIGS. 3B and 4.

In one particular example, continuing with FIG. 2, the coolant jacket 220, the stator 200, and the rotor 202 (including the balancing plates 204, the rotor shaft 206, the hub 207, the core 208, and the bearings 209) may be included in a machine cartridge 230. During assembly of the electric machine, the machine cartridge 230 may be pressed into the machine housing 210, prior to attaching the covers 105, 107 to the housing 210. Specifically, the machine cartridge 230 may be press-fit into the housing 210 thereby forming a press-fit interface 232, in one example. Thus, the electric machine 100 may be constructed as a two-piece design, including the machine cartridge 230 and the housing 210 of the housing assembly 110, which may allow for efficient assembly and repair thereof.

Further, as illustrated in FIGS. 3A-3B, seals 211, 213 (e.g., O-ring seals) may be positioned between the coolant jacket 220 and the housing 210, proximate the opposing axial sides 118, 120 of the electric machine 100, respectively, for instance. Thus, when the machine cartridge 230 is press-fit into the housing 210, the coolant jacket 220 and the coolant channels 216 (formed between the coolant jacket 220 and the housing 210) are sealed from the environment. In this way, the chance of coolant leaks from the coolant jacket 220 may be reduced. Further, in some examples, additional seals 215 may be disposed between the housing 210 and the covers 105, 107, which may reduce the chance of another coolant leaking from the machine housing assembly 110, such as an oil provided for cooling and/or lubricating the stator and the rotor.

As previously described, the boundaries of the coolant channels 216 formed by the coolant jacket 220 may include the interior surface 212 of the machine housing 210, the side surfaces 225, 226 of the coolant jacket wall 224, and the exterior surface 223 of the coolant jacket body 221. These boundaries are formed by two or more materials having different thermal properties. For example, the machine housing 210 and the coolant jacket 220 are formed of materials having different coefficients of thermal expansion. Thus, the machine housing 210 and the coolant jacket 220 thermally expand and contract at different rates based on changes in temperature during different operating conditions.

In one example, the coolant jacket 220 is constructed out of a material having a higher coefficient of thermal expansion than the material used to construct the machine housing 210. For instance, the coolant jacket 220 may be formed from a relatively high thermal expansion material, such as aluminum, or an aluminum alloy. Further, the machine housing 210 may be formed of a lower thermal expansion material, such as steel, and/or iron (e.g., ductile iron, and/or cast iron), in some examples. Thus, the coolant jacket 220 may thermally expand and contract more rapidly than the machine housing 210. More particularly, as a temperature increases at the electric machine 100, the wall 224 of the coolant jacket may, in some examples, begin to expand in a radially outward direction towards the interior surface 212 of the housing 210. Further, as the coolant jacket 220 thermally expands, it will be understood that the face-sharing contact between the interior surface 222 of the coolant jacket body and the stator laminations 201 may prevent the coolant jacket from expanding radially inwards towards the stator 200. Meanwhile, the housing 210 may experience less (or substantially zero) thermal expansion during the temperature increase. The varying size of the coolant jacket 220, and particularly the wall 224 thereof, will affect the configuration of the coolant channels 216, thereby altering the flow of coolant between the coolant jacket 220 and the machine housing 210, as will be described in the following paragraphs.

Referring collectively to FIGS. 2 and 3A, the electric machine 100 and the coolant jacket 220 are shown in a first configuration under a higher temperature operating condition. As described herein, the "higher temperature operating condition" may refer to a time when an operating temperature of the electric machine 100 is above a threshold temperature (e.g., 10° C., 25° C., or within the range between 10° C.-25° C.) or within a higher temperature range (e.g., 10° C.-100° C., or from 25° C.-100° C., which may be approximately from 10° C. to 100° C., or from 25° C. to 100° C., in different examples. However, in other examples, the threshold temperature may be within the range between 5° C. and 30° C. or the higher temperature range may be –5° C.-110° C. or 30° C.-25° C. In some cases, the threshold temperature may be selected based on expected machine operating conditions.

Thus, during the higher temperature operating conditions, the machine housing 210 and the coolant jacket 220 experience higher temperatures (e.g., above the threshold temperature) causing thermal expansion of the materials. Due to the coolant jacket 220 being formed of a higher thermal expansion material than the housing 210, the coolant jacket expands at a different rate than the housing 210. Specifically, during the higher temperature conditions, the peripheral surfaces 227 of the coolant jacket wall 224 are in sealing contact with the interior surface 212 of the housing 210, as illustrated. In other words, the peripheral surfaces 227 close against the interior surface 212 when the machine's operating temperature is above the threshold temperature, such that the coolant channels 216 are distinguished by boundaries including the exterior surface 223 of the coolant jacket body 221, the side surfaces 225, 226 of the coolant jacket wall 224, and the interior surface 212 of the housing 210, as previously discussed.

Thus, when the electric machine 100 is operating in the higher temperature range (as depicted in FIGS. 2 and 3A), the coolant channels 216 may collectively form a spiraling coolant pathway or parallel flow pathway for moving coolant through the housing (between a coolant inlet and a coolant outlet). Under the higher temperature conditions, the peripheral surface(s) 227 of the coolant jacket wall(s) 224 seal against the interior surface 212 of the housing 210 and block the flow of coolant axially between channels. Thus, the coolant takes a more circuitous route through the coolant jacket, thereby increasing the amount of heat removed from the stator. This increased heat removal capability is desirable as it allows the coolant jacket to effectively cool the machine at higher temperatures, thereby enhancing machine efficiency and extending the longevity of the machine. However, when the coolant circuitously flows through the coolant channels, flow losses in the coolant circuit increase and correspondingly increase the pressure drop in the coolant circuit.

Conversely, as the machine's operating temperature drops and the machine is operated under a lower temperature condition, as illustrated in FIGS. 3B and 4, the coolant jacket 220 contracts more rapidly than the motor housing 210. The "lower temperature operating condition" indicates a time when the operating temperature of the electric machine 100 is below the threshold temperature, or within a lower temperature range. When the coolant jacket 220 shrinks in size under the lower temperature condition, the coolant jacket wall 224 retracts away from the interior surface 212 of the housing 210, such that the peripheral surfaces 227 of the wall 224 are no longer in sealing contact with the interior surface of the housing. This retraction results in the formation of a gap 300 (e.g., a radial gap) between at least a portion of the peripheral surfaces 227 of the coolant jacket wall 224 and the interior surface 212 of the housing 210. The gap 300 may be formed along the axial length 304 of the peripheral surface 227. In the spiral coolant channel configuration, the gap is present along at least a portion of the spiraling peripheral surface. On the other hand, in the parallel coolant channel configuration, a gap is present along at least a portion of each of the peripheral surfaces of the walls that separate the parallel channels.

As particularly illustrated in FIG. 4, the gap 300 may have a radial width 400, as measured between the peripheral surface 227 of the coolant jacket wall 224 and the interior surface 212 of the machine housing 210. Due to the higher thermal expansion material of the coolant jacket 220, the radial width 400 of the gap 300 varies with temperature. That is, the width 400 increases as the temperature of the coolant jacket decreases and more generally when the operating temperature of the electric machine decreases. In such an example, and when the coolant channels have a parallel flow arrangement, the gaps may have substantially similar radial widths. However, in other examples, the gaps may have different radial widths, due to the variance material temperature and/or construction across the axial length of the coolant jacket 220 and housing 210, for instance.

As previously indicated, the radial width 400 of the gap decreases as the temperature increases and causes the wall 224 of the coolant jacket 220 to contract and move away from the interior surface 212 of the machine housing, thus forming a bypass flow passage through the gap. When the temperature reaches or exceeds a threshold level, or rises into the higher temperature range, the gap closes such that the interior surface 212 of the housing 210 is in sealing contact with the peripheral surface 227 of the wall 224.

Further, while the width 400 of the gap 300 varies with temperature, the variation in the size of the gap may be tuned to achieve desired flow bypass characteristics such as a target pressure drop (or range of pressure drops) during lower temperature conditions and a target flow rate (or range of coolant flowrates) during higher temperature conditions. The extent to which the coolant jacket 220 retracts during lower temperature operating conditions may depend on the material selection and/or the size and shape of the wall 224 thereof. As such, in one use-case example, the axial length 304 of the peripheral surface 227, shown in FIG. 3B, may be greater than the expected range of radial widths of the gap to realize a desired coolant jacket flow pattern that suits the machine's intended operating environment. In another use-case example, the radial length of the sidewalls 225, 226 may be greater than the expected range of radial widths of the gap.

Turning again to FIG. 3B, the gap(s) 300 are shown between the peripheral surface(s) 227 of the coolant jacket wall 224 and the interior surface 212 of the machine housing 210, which form bypass flow passages. The general direction of flow through the bypass flow passages is indicated via arrows 302. To elaborate, as coolant flows into the coolant jacket during lower temperature conditions and the bypass flow passage(s) 302 are formed (due to thermal contraction of the coolant jacket 220), the coolant may flow through gaps 300 between adjacent coolant channels 216, substantially bypassing a portion of the coolant jacket channels.

In one particular use-case example, the coolant jacket 220 may be constructed out an aluminum alloy, such as 6061 aluminum having a coefficient of thermal expansion of approximately 23.4 µm/m·° C., and the machine housing 210 may be constructed out of a steel having a coefficient of thermal expansion of approximately 13 µm/m·° C. As such, the coolant jacket will expand more rapidly than the machine housing due to a temperature increase. Further, the coolant jacket 220 and the machine housing 210 may be sized and/or dimensioned to have an interference fit at and above a nominal operating temperature. For instance, the threshold temperature may be approximately 10° C., such that the higher temperature operating conditions are defined as a range between 10° C. and a maximum operating temperature, such as 100° C.

Thus, during the higher temperature operating conditions, as previously described, the peripheral surfaces 227 (e.g., at the outermost diameter of the wall 224 of the coolant jacket 220) may be in face sharing contact with the interior surface of the machine housing 210, therefore forcing coolant through the coolant channels 216. When the operating temperature falls below the threshold temperature or is within a lower temperature range, which may include temperatures between 10° C. and −40° C., the coolant jacket 220 will retract away from the machine housing 210 to allow some coolant to bypass the coolant channels 216. According to the use-case example described herein, the radial width 400 of the gap 300 may vary between 0.16 mm and 0.20 mm as the operating temperature fluctuates within the lower temperature range. However, a variety of radial gap widths are possible.

The flow rate of coolant flowing between the coolant jacket 220 and the machine housing 210 may vary due to the variance in the rates thermal expansion and contraction of the coolant jacket and the housing, respectively, as a result of material selection thereof. More specifically, when the bypass flow passages 302 are formed in the gaps 300, at lower operating temperatures, the coolant flow rate is decreased relative to the coolant flow rate when the bypass flow passage is not present at higher operating temperatures. In this way, the pressure drop across the coolant jacket 220 is passively reduced (e.g., without adjusting the pump and/or implementing actuators, valves and the like within the coolant circuit, if so desired). As such, in some examples, the coolant pump may be the sole component of the cooling system 102 which actively adjusts the coolant flow rate, thereby avoiding structural and algorithmic complexities associated with implementing additional actuators, valves, and the like. Thus, the coolant circuit may not include valves or other actuators that are designed vary the coolant flow rate therein, in one example. In such an example, a straightforward coolant pump control strategy may be utilized. For instance, the coolant pump, which may be a fixed displacement pump, may be turned on during electric machine operation and off when the machine is not in operation and granular flowrate adjustments during machine operation may avoided, if so desired. Alternatively, more complex pump flow control strategies which demand more computing resources may be used in other embodiments.

FIG. 5 depicts a method 500 for operating a cooling system for an electric machine, such as the electric machine 100 and cooling system 102 shown in FIGS. 1-4, according to one example. However, the method 500 may be implemented by another suitable electric machine and cooling system, in other embodiments. Instructions for carrying out at least a portion of the steps in the method 500 may be executed by a controller based on instructions stored on a memory unit of the controller and in conjunction with signals received from the cooling system, electric machine, and/or electric drive unit. For instance, to initiate coolant flow, the controller may send a command signal to the pump and responsive to receiving the command signal the pump may be turned on to initiate coolant flow through the coolant circuit.

At 502, the method includes flowing coolant through the coolant jacket. The pump, in the cooling system, may be operated to circulate the coolant through the coolant jacket, as indicated above. Flowing coolant through the coolant jacket includes steps 504 or 506 which are dependent on the operating temperature of the electric machine. It will be understood that the flow patterns in steps 504 and 506 are passively generated using the material construction of the machine's housing and coolant jacket.

Under the higher temperature condition the method includes, at 504, flowing coolant through coolant channels in the coolant jacket while the bypass passages are blocked. As previously discussed, the coolant jacket is in sealing contact with the machine housing when operating under the higher temperature condition such that the coolant is blocked from flowing through the gap which axially bypasses the coolant channels.

Conversely at 506 the method includes, flowing coolant through one or more bypass passages formed between the coolant jacket and the machine housing under a lower temperature condition. As indicated above, this bypass flow pattern, enables the coolant flow rate to be lowered, thereby reducing the pressure drop across the coolant jacket. In this way, the heat transfer surface between the coolant and the coolant jacket and machine housing may be increased under higher temperature operating conditions to provide greater cooling effects, as desired. Further, the bypass coolant flow realized at lower temperature operating conditions allows the cooling system to avoid undesirable losses associated with excessive pressure drops at lower operating temperatures. Consequently, the system can implement an efficient and reliable technique for passively adjusting a coolant flow rate based on temperature changes to increase system efficiency.

The technical effect of the cooling system operating method described herein is to passively adjust the flow of coolant through a coolant jacket such that the system is able to meet the different cooling demands under varying operating temperatures without experiencing undesirable pressure drop across the coolant jacket, under lower operating temperatures. As a result, system efficiency is increased.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The invention will be further described in the following paragraphs. In one aspect, a method for an electric machine cooling system is provided that comprises: operating a pump to flow coolant through a plurality of coolant channels in a coolant jacket, wherein two or more materials that form boundaries of the plurality of coolant channels are configured to thermally expand at different rates and form a bypass flow passage of at least one of the plurality of coolant channels when the electric machine is operating under a lower temperature operating condition. In one example, when the electric machine is operating under a higher temperature condition, the bypass flow passage may be blocked by a thermal expansion of the two or more materials. In another example, the pump may be the sole cooling system component that actively adjusts coolant flowrate through the plurality of coolant channels. In yet another example, the bypass flow passage may be a radial gap.

In another aspect, a cooling system for an electric machine is provided that comprises: a housing at least partially enclosing a rotor, a stator, and a coolant jacket, the coolant jacket comprising a plurality of coolant channels that receive coolant from a coolant inlet; wherein two or more materials that form boundaries of the plurality of coolant channels are configured to thermally expand at different rates and form a bypass flow passage of at least one of the plurality of coolant channels when the two or more materials are below a threshold temperature or within a lower temperature range.

In yet another aspect, a cooling system for an electric machine is provided that comprises: a cartridge circumferentially enclosed within a housing and including: a rotor, a stator, and a coolant jacket that comprises: a plurality of coolant channels that receive coolant from a coolant inlet; wherein an interior surface of the housing forms a first portion of a boundary of the plurality of coolant channels and a wall of the coolant jacket forms a second portion of the boundary of the plurality of coolant channels; wherein, while the electric machine is operating under a lower temperature condition, a bypass flow gap is formed between the interior surface of the housing and the wall of the coolant jacket; and wherein, while the electric machine is operating under a higher temperature condition, the interior surface of the housing and the wall of the coolant jacket are in contact and seal the bypass flow gap.

In any of the aspects of combinations of the aspects, when the two or more materials that form the boundaries of the plurality of coolant channels are above the threshold temperature of within a higher temperature range, the bypass flow passage may be closed.

In any of the aspects of combinations of the aspects, when the bypass flow passage is closed, the plurality of coolant channels may form a circumferentially spiraling coolant passage and when the bypass flow passage is open, the coolant may flow axially between two of the plurality of coolant channels that form the circumferentially spiraling coolant passage.

In any of the aspects of combinations of the aspects, the coolant jacket may be included in a cartridge that comprises the rotor and the stator, and the cartridge may form a press-fit interface with the housing.

In any of the aspects of combinations of the aspects, the boundaries of the plurality of coolant channels may include an interior surface of the housing and side surfaces of a plurality of walls of the coolant jacket.

In any of the aspects of combinations of the aspects, the peripheral surfaces may be in sealing contact with the interior surface of the housing when the two or more materials are above the threshold temperature or within a higher temperature range; and a gap that forms the bypass flow passage may be present when the two or more materials are below the threshold temperature or within the lower temperature range.

In any of the aspects of combinations of the aspects, the gap may be a radial gap.

In any of the aspects of combinations of the aspects, the plurality of coolant channels may each have a polygonal cross-section.

In any of the aspects of combinations of the aspects, the bypass flow gap may have a radial width that permits coolant flow therethrough during the lower temperature condition.

In any of the aspects of combinations of the aspects, the wall of the coolant jacket may circumferentially extend around the electric machine.

In any of the aspects of combinations of the aspects, the wall may have two side surfaces and a peripheral surface.

In any of the aspects of combinations of the aspects, the electric machine may be included in an electric drive unit of a vehicle.

In any of the aspects of combinations of the aspects, the two or more materials may include aluminum and steel or iron.

In any of the aspects of combinations of the aspects, the housing may be at least partially constructed out of aluminum and the cartridge may be at least partially constructed out of steel or iron.

In another representation, an electric motor cooling system in a vehicle system is provided that comprises a cartridge mated with an outer casing, the cartridge includes a barrier, wherein the barrier and the outer casing have different coefficients of thermal expansion such that under a higher temperature condition the barrier is in face sharing contact with the outer casing and partitions a coolant jacket into a two channels that circumferentially extend around the cartridge and under a lower temperature condition the barrier is spaced away from the outer casing such that a channel bypass is formed through which coolant flows between the two channels.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various system hardware components in combination with the electronic controller.

As used herein, the terms "approximately" and "substantially" are construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A cooling system for an electric machine, comprising:
a housing at least partially enclosing a rotor, a stator, and a coolant jacket, the coolant jacket comprising a plurality of coolant channels that receive coolant from a coolant inlet;
wherein the housing and the coolant jacket are constructed out of two or more materials that are configured to thermally expand at different rates and form a bypass flow passage of at least one of the plurality of coolant channels when the two or more materials are below a threshold temperature or within a lower temperature range.

2. The cooling system of claim 1, wherein, when the two or more materials are above the threshold temperature or within a higher temperature range, the bypass flow passage is closed.

3. The cooling system of claim 2, wherein, when the bypass flow passage is closed, the plurality of coolant channels form a circumferentially spiraling coolant passage and wherein, when the bypass flow passage is open, the coolant flows axially between two of the plurality of coolant channels that form the circumferentially spiraling coolant passage.

4. The cooling system of claim 1, wherein:
the coolant jacket is included in a cartridge that comprises the rotor and the stator; and
the cartridge forms a press-fit interface with the housing.

5. The cooling system of claim 1, wherein the two or more materials are included in an interior surface of the housing and side surfaces of a plurality of walls of the coolant jacket.

6. The cooling system of claim 5, wherein:
peripheral surfaces of the plurality of walls of the coolant jacket are in sealing contact with the interior surface of the housing when the two or more materials are above the threshold temperature or within a higher temperature range; and
a gap that forms the bypass flow passage is present when the two or more materials are below the threshold temperature or within the lower temperature range.

7. The cooling system of claim 6, wherein the gap is a radial gap.

8. The cooling system of claim 1, wherein the plurality of coolant channels each have a polygonal cross-section.

9. The cooling system of claim 1, wherein the two or more materials include aluminum and steel or iron.

10. A method for an electric machine cooling system, comprising:
operating a pump to flow coolant through a plurality of coolant channels in a coolant jacket;
wherein a housing at least partially encloses the coolant jacket;
wherein the housing and the coolant jacket are constructed out of two or more materials that are configured to thermally expand at different rates and form a bypass flow passage of at least one of the plurality of coolant channels when the electric machine is operating under a lower temperature condition.

11. The method of claim 10, wherein, when the electric machine is operating under a higher temperature condition, the bypass flow passage is blocked by a thermal expansion of the two or more materials.

12. The method of claim 10, wherein the pump is the sole cooling system component that actively adjusts coolant flowrate through the plurality of coolant channels.

13. The method of claim 10, wherein the bypass flow passage is a radial gap.

14. The method of claim 10, wherein the two or more materials include aluminum and steel or iron.

15. A cooling system for an electric machine, comprising:
a cartridge circumferentially enclosed within a housing and including:
a rotor, a stator, and a coolant jacket that comprises:
a plurality of coolant channels that receive coolant from a coolant inlet;
wherein an interior surface of the housing forms a first portion of a boundary of the plurality of coolant channels and a wall of the coolant jacket forms a second portion of the boundary of the plurality of coolant channels;
wherein, while the electric machine is operating under a lower temperature condition, a bypass flow gap is formed between the interior surface of the housing and the wall of the coolant jacket; and
wherein, while the electric machine is operating under a higher temperature condition, the interior surface of the housing and the wall of the coolant jacket are in contact and seal the bypass flow gap.

16. The cooling system of claim 15, wherein the bypass flow gap has a radial width that permits coolant flow therethrough during the lower temperature condition.

17. The cooling system of claim 15, wherein the wall of the coolant jacket circumferentially extends around the electric machine.

18. The cooling system of claim 15, wherein the wall has two side surfaces and a peripheral surface.

19. The cooling system of claim 15, wherein the electric machine is included in an electric drive unit of a vehicle.

20. The cooling system of claim 15, wherein the housing is at least partially constructed out of aluminum and the cartridge is at least partially constructed out of steel or iron.

* * * * *